April 24, 1956 E. O. GUERNSEY 2,743,214
"K" FACTOR CONTROL OF REFORMATE YIELD
Filed Jan. 6, 1953 3 Sheets-Sheet 1

INVENTOR.
EDWIN O. GUERNSEY
BY Francis F. Johnston
AGENT

April 24, 1956  E. O. GUERNSEY  2,743,214
"K" FACTOR CONTROL OF REFORMATE YIELD
Filed Jan. 6, 1953  3 Sheets-Sheet 2

INVENTOR.
EDWIN O. GUERNSEY
BY Francis F. Johnston
AGENT

United States Patent Office 2,743,214
Patented Apr. 24, 1956

2,743,214

"K" FACTOR CONTROL OF REFORMATE YIELD

Edwin O. Guernsey, Woodbury, N. J., assignor to Socony Mobil Oil Company, Inc., a corporation of New York Application January 6, 1953, Serial No. 329,817

6 Claims. (Cl. 196—50)

The present invention relates to reforming hydrocarbons and, more particularly, to the control of the yield of gasoline having a required octane number by correlation of the amount of water in the reaction zone with the "K" factor of the charge stock.

At the outset, it will be advantageous to define certain of the terms used hereinafter although the terms defined have been used for many years by those interested in the basic reactions involved. Thus, reforming is the generic term used to include one or all of the molecular conversions, whether occurring as an isolated reaction or as a chain of reactions, individually designated as isomerization, dehydrogenation and dehydrocyclization. The "K" factor, which is an empirically obtained characterization of a mixture of hydrocarbons, usually a petroleum fraction, has been discussed by several investigators, notably Watson and Nelson in Ind. Eng. Chem. 25, 880 (1933) and Watson, Nelson and Murphy in Ind. Eng. Chem. 27, 1460 (1935). The equation by means of which the "K" factor can be calculated is given by Watson and Nelson in Ind. Eng. Chem. 25, 880 (1933) as $$\text{"K"} = \frac{(\text{mean average boiling point } °R)^{1/3}}{\text{specific gravity } (60°/60°)}$$

When reforming gasoline, for example, whether straight run, cracked or a mixture of straight run and cracked gasoline, the object of the conversion is to raise the octane rating or octane number of the charge stock by subjecting the charge stock to conditions under which any or all of the molecular changes, isomerization, dehydrogenation and dehydrocyclization take place and as a result of which the octane rating or octane number of the product is higher than that of the charge stock. It is manifest that from a practical standpoint the increase in octane rating must be achieved with the lowest possible concomitant loss in yield.

Figure 1:
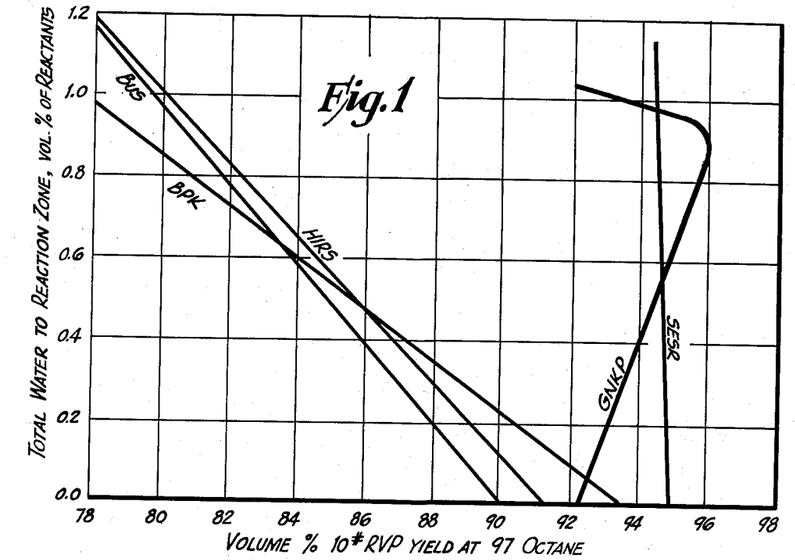

In 1938, U. S. Patent No. 2,131,089 was granted to Otto Beeck and H. P. A. Groll for the discovery that if sufficient water were added to a charge stock to be reformed to provide a monomolecular layer of water on the catalyst the activity of the catalyst can be maintained at a practical optimum value over relatively long periods of time. The patentees state that when water in an amount of about 0.03 to about 0.2 volume per cent based upon the hydrocarbon reactant is added to the reaction mixture, a monomolecular layer of water is formed on the catalyst. On the other hand, more recently, those skilled in the art have taught that the now commonly employed catalysts, for example the catalysts comprising associations of alumina and the group VI metals, when contaminated with moisture and/or loosely bound oxygen which in the reforming reaction appears in the product as water, must be pretreated to reduce the concentration of water and/or loosely bound oxygen in order to obtain the maximum yield of reformate of required octane rating. Thus, yield of gasoline having a Reid vapor pressure of 10 pounds and a given octane rating from a straight run petroleum designated as BUL was adversely affected by water and/or loosely bound oxygen brought into the reaction zone with the moving catalyst. Yet, when reforming second gasoline designated as PAL over the same catalyst the yield of gasoline having a Reid vapor pressure of 10 pounds (10# RVP) and a given octane rating was not adversely affected by water and/or loosely bound oxygen brought into the reaction zone with the moving catalyst. Thus, it is manifest that the prior art has taught two conflicting operations, to wit: (1) to pretreat the catalyst to remove water and/or loosely bound oxygen; and (2) to add water to the charge stock to insure that a monomolecular layer shall exist on the catalyst. It has been discovered that either procedure can produce desired results when applied to the proper charge stocks. Accordingly, it is an object of the present invention to provide a means for reforming petroleum fractions to obtain maximum yield of the reformate having a required octane rating from a given charge stock, either in the presence of or absence of moisture. It is another object of the present invention to provide a means for reforming one charge stock in the presence of a critical amount of water and another charge stock in the presence of the least possible practical amount of water. It is a further object of the present invention to provide a means for reforming, substantially simultaneously, two charge stocks, one in the presence of water and the other in the absence of any substantial amount of water. Other objects and advantages of the present invention will become apparent from the following description taken in conjunction with the drawings in which Figure 1 is a graph showing the relation between the total water content of the reactants and the 10# RVP yield a 97 O. N. for several charge stocks. The line bearing the legend BUS indicates the aforesaid relation for a straight run naphtha. The line bearing the legend BPK indicates the aforesaid relation for a cracked naphtha. The line bearing the legend HIRS indicates the aforesaid relation for a second straight run naphtha. The legend SESR identifies the line indicating the aforesaid relation for a third straight run naphtha. The legend GNKP identifies the line indicating the aforesaid relation for a second cracked naphtha.

As will become apparent hereinafter it has been discovered that the effect of the moisture content of the reactants upon the yield of reformate having a given octane number is correlated to the "K" factor of the charge stock being reformed. Thus, for straight run naphtha BUS the "K" factor is obtained from the equation $$\text{"K"} = \frac{(\text{mean average boiling point } °R)^{1/3}}{\text{specific gravity } (60°/60°)}$$

From the nomograph published by Smith and Watson in Ind. Eng. Chem. 29, 1408 (1937) and the known average molecular weight of 130 and the gravity of 54° API, Mean average boiling point °R=763
Specific Gravity 60°/60°=0.763

$$\text{"K"} = \frac{(763)^{1/3}}{0.763} = \frac{9.18}{0.763} = \frac{0.763}{12.02}$$

Upon turning to Figure 1 showing the relation between the total water content of the reactants for various charge stocks, attention is directed to the line bearing the legend BUS. It is manifest that for this straight run naphtha the yield of 10# RVP at 97 O. N. at zero volume per cent water in the reacting gases is appreciably greater than the yield when the reacting gases contain 1.115 volume per cent water.

The data presented in Figure 1 were obtained when reforming various naphthas over a chromium oxide-alumina catalyst at 175 p. s. i. g. to 10# RVP at 97 O. N. The graph, Figure 1, establishes that the water content of the reactant gases is correlated to the yield of reformate having a required octane rating or octane number (O. N.). The slope of the lines in Figure 1 indicates the loss in yield for 0.5 volume per cent water in the reactant gases. These values are presented in Table I.

*Table I*

| Stock | Percent loss of 10# RVP-97 O. N. yield per 0.5 Vol. percent H$_2$O in the Reactant Gases |
| --- | --- |
| BUS | 5.2 |
| BPK | 8.3 |
| HIRS | 5.5 |
| SESR | 0.2 |
| GNKP | [1] −2.2 |

[1] Equivalent to an increase in yield.

It is manifest that there is no apparent correlation between loss in yield and the classification of the charge stock as straight run or cracked, since for one straight run naphtha the loss in yield is about 5.2 per cent per 0.5 volume per cent of water in the reactant gases, while with another straight run naphtha the loss in yield is about 0.2 per cent per 0.5 volume per cent of water in the reactant gases. However, when the loss in yield per 0.5 volume per cent of water in the reactant gases is plotted against the "K" factor of the charge stock as in Figure 2, it is manifest that those charge stocks which have a "K" factor greater than about 11.6 to about 11.75 suffer the greatest loss in yield per 0.5 volume per cent of water in the reactant gases. In other words, those charge stocks which have a "K" factor appreciably greater than about 11.55 to about 11.70 must be reformed in the absence of water, whereas those stocks having a "K" factor less than about 11.55 to about 11.70 preferably are reformed in the presence of varying concentrations of water.

Figure 2:
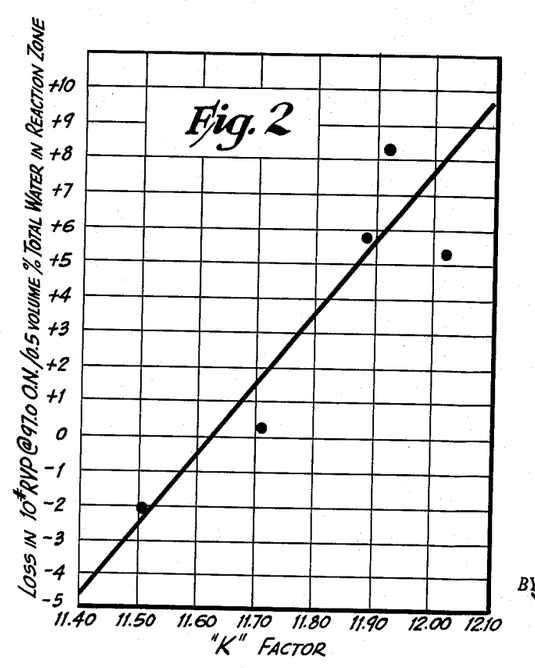
Figure 2 is a graph showing the relation between loss in 10# RVP yield at 97 O. N. per 0.5 volume per cent water in the reactant gases and the "K" factor of the charge stock.

The data from which the graph of Figure 2 was prepared are given in Table II.

*Table II*

| Charge Stock | Percent loss in yield 10# RVP 97 O. N./0.5 Vol. Percent H$_2$O in the reactant gases | "K" Factor |
| --- | --- | --- |
| BUS | 5.2 | 12.02 |
| BPK | 8.3 | 11.91 |
| HIRS | 5.5 | 11.88 |
| SESR | 0.2 | 11.71 |
| GNKP | [1] 2.2 | 11.51 |

[1] Represents an increased yield.

Since the loss in yield at 0.5 volume per cent of water in the reactant gases is a minimum for naphtha SESR, a charge stock having a "K" factor such as that of the naphtha SESR can be considered typical of the median stocks substantially insensitive to water. The "K" factor can then be correlated with the loss in yield per 0.5 volume per cent of water in the reactant gases by plotting the loss as plus and the gain yield as a minus loss. Such a graph is presented in Figure 2. In other words, as the "K" value approaches 11.55 to 11.75 (the transition value) from a "K" value less than 11.55 the water content of the reactant gases should be reduced from a value of about 0.6 to about 0.9 volume per cent water in the reactants (naphtha plus recycle) introduced into the reforming zone to zero concentration for stocks having "K" factors of 11.8 and greater. Stated in another way, the stocks having "K" factors within the transition range of about 11.55 to about 11.75 are insensitive to water up to about 0.6 volume per cent in the reactants introduced into the reforming zone. As the "K" factor decreases from about 11.6 greater and greater concentrations of water can be present without deleterious effect, i. e., loss of 1.5 per cent yield and in fact with advantage. However, as the "K" factor increases from about 11.75 only a lower and lower concentration of water can be tolerated without the deleterious effect upon the yield for a given octane rating and, in fact, for optimum yield should be excluded from the reforming zone.

In accordance with the foregoing principles a split flow reactor can be used in which, with the catalyst flowing downwardly, the upper portion is used to reform a naphtha having a "K" factor less than the transition range to a given octane rating while the lower portion of the same reactor is used to reform a naphtha having a "K" factor greater than the transition value. When there are available to a given refinery no naphthas having a "K" factor less than the transition range, a naphtha having a "K" factor value most nearly approaching that of the transition range is reformed in the upper portion of the reactor through which the catalyst flows downwardly while a naphtha having a "K" factor greater than the "K" value of the aforesaid naphtha is reformed in the lower portion of the reactor. When the naphthas available to a refinery all have "K" values below the transition range, water in amounts up to about 0.9 volume per cent can be added. When reforming a naphtha having a high "K" value, i. e., about 11.8 to about 12.5, in a split flow reactor through which the catalyst flows downwardly the naphtha can be reformed in two passes, the initial feed being to the lower portion of the reactor and the second pass taking place in the upper portion of the reactor.

The principles discussed hereinbefore can be applied to reforming reactions taking place in fixed bed reactors. That is, for example, when a fixed bed of fresh or regenerated catalyst is available and another bed of aged catalyst is available a naphtha with a "K" factor below the transition range is charged to the fresh catalyst while a naphtha having a "K" factor above the transition range is charged to the aged catalyst. Similarly, immediately after the catalyst of a fixed bed reactor is regenerated the reactor can be used to reform a naphtha having a "K" factor less than the transition range or having a "K" factor in the transition range until the moisture content of the effluent gases is not greater than that of the gases entering the reactor, and then the feed is changed to a naphtha having a "K" factor greater than those of the transition range. Schematic flow sheets illustrating the foregoing are provided in Figures 3, 4 and 5.

Figure 3:
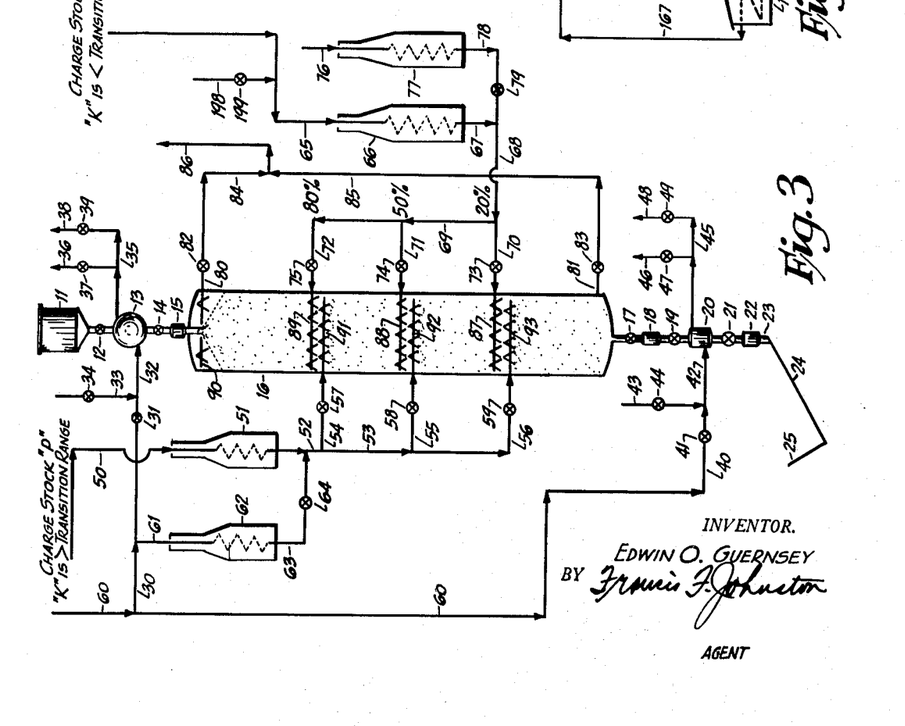
Figure 3 is a schematic flow sheet illustrating the application of the principles of the present invention to the reforming of two charge stocks over the same catalyst in two reaction zones in series.

Referring now to Figure 3. The schematic flow sheet provided in Figure 3 is illustrative of the application of the principles of the present invention to reforming two charge stocks, for example, two naphthas having different "K" factors, one having a "K" factor appreciably greater than the "K" factors of the transition range and the other having a "K" factor appreciably less than the "K" factors of the transition range.

Thus, for example, a naphtha having a "K" factor less than the "K" factors of the transition range, i. e., a "K" of 11.51 characterized as follows:

Naphtha M:
- Specific gravity 60°/60° __________ 0.799
- Av. molecular weight (from ASTM distillation) __________ 129
- Boiling range:
  - Initial boiling point __________ °F__ 237
  - 10% point __________ °F__ 277
  - 50% point __________ °F__ 319
  - 90% point __________ °F__ 369
  - End point __________ °F__ 399
- "K" __________ 11.51 is used as the feed to the upper portion of the reactor 16 while a naphtha having a "K" factor greater than the "K" factors of the transition range, i. e., a "K" of 11.97 characterized as follows:

Naphtha P:
- Specific gravity 60°/60° __________ 0.760
- Av. molecular weight (from ASTM distillation) __________ 126
- Boiling range:
  - Initial boiling point __________ °F__ 230
  - 10% point __________ °F__ 268
  - 50% point __________ °F__ 296
  - 90% __________ °F__ 337
  - End point __________ °F__ 376
- "K" __________ 11.97 is used as the feed to the lower portion of the reactor 16.

Figure 4:
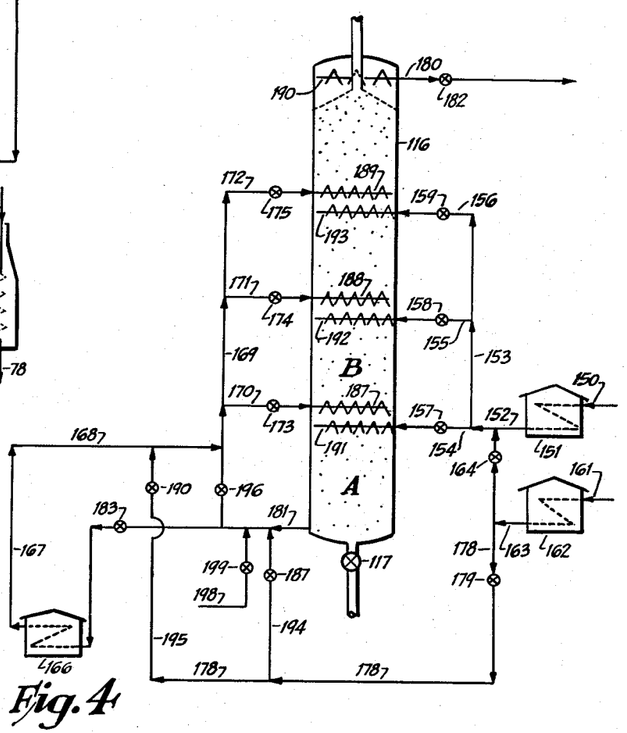
Figure 4 is a schematic flow sheet illustrating the application of the principles of the present invention to a single charge stock in two "passes.

As is well known to those skilled in the art the increase in octane rating of a naphtha upon reforming is generally dependent upon the severity of the reforming conditions under which the naphtha is reformed. In general, the factors controlling the severity of reforming are (1) reaction temperature, (2) reaction pressure, and (3) space velocity, i. e., volume (liquid) of hydrocarbon reactant per volume of catalyst per hour. In a single reactor having a plurality of reaction zones in which the catalyst flows downwardly successively through the reaction zones, the reaction temperatures in all zones are dependent to a very great extent upon the temperature of the catalyst entering the reactor. In general, it is desirable to operate all of the reaction zones at substantially the same pressure, within a range of about 10 to 15 p. s. i. Consequently, greatest flexibility for control of the severity of reforming conditions is provided by ease of regulating the space velocity. As disclosed in co-pending U. S. application Serial No. 285,481, this is done by regulating the effective depth of the catalyst bed in each reaction zone, and by regulating the velocity of the vapors passing through each zone. Consequently, while a reactor with catalyst beds of fixed depth is satisfactory for the purpose of the present invention, greater flexibility of operation is provided by a reactor having a plurality of pairs of inlets whereby the depths of the catalyst beds can be readily regulated and varied. It will also be understood by those skilled in the art that while only three pairs of hydrocarbon reactant inlets are shown in Figures 3 and 4 dividing the reactors into two zones of 20% and 80%, 50% and 50%, and 80% and 20%, a greater number of reactant inlet pairs can be provided to thereby divide the catalyst bed into two beds of complementary depths different from those provided in the drawings. It will also be recognized, that when the characteristics of the two feed naphthas are such that each can be reformed to yield a reformate of substantially the same octane rating in a reaction zone of less than 50% of the total depth of the catalyst column in the reactor, an intermediate zone can be blocked off in any suitable manner known to those skilled in the art.

In the following discussion of the schematic flow sheets presented in Figures 3 and 4, the course of the catalyst through the reactor will first be described, and then the paths of the hydrocarbon reactants and products will be described.

In general, catalytic reforming comprises contacting a suitable reforming catalyst with a hydrocarbon or a mixture of hydrocarbons capable of undergoing any one or all of the molecular changes, isomerization, hydrogenation, dehydrogenation and dehydrocyclization or a mixture of hydrocarbons at least some of which are capable of undergoing the aforesaid molecular changes under conditions of temperature and pressure such that isomerization, hydrogenation, dehydrogenation and dehydrocyclization can occur. At present, it is preferred to employ a chromium oxide-alumina catalyst comprising at least 70 mol per cent alumina and about 18 to 30 mol per cent chromium oxide, although other particle form reforming catalysts can be used. The reforming reaction or reactions are carried out at temperatures of about 800° to about 1300° F. preferably at about 960° to about 1060° F., at pressures of about 15 to about 600 p. s. i. a. preferably about 100 to about 300 p. s. i. a. Usually it is preferred to employ a gaseous heat carrier such as recycle gas in the ratio of about 1 to about 15 mols, preferably about 4 to about 10 mols of gas per mol of charge stock. It is also general practice to carry out the reforming reactions in the presence of a gas comprising at least 25 per cent hydrogen and preferably about 35 to about 60 per cent hydrogen, balance $C_1$ to $C_6$ hydrocarbons. When such a hydrogen-containing gas is used, the ratio of hydrogen to charge stock is about 1 to 8 preferably about 2 to about 5 mols of hydrogen per mol of charge stock. When the charge stock is a mixture of hydrocarbons, the average molecular weight is determined in the usual manner from the ASTM distillation. In general, the space velocity will be of the order of about 0.1 to about 6.0 and preferably about 0.5 to about 2.0.

The catalyst enters the reactor at the top, at a temperature of about 100°–1100° F. preferably about 400° to about 1050° F. The vapors enter the reactor at about 850° to about 1080° F. preferably about 960° to about 1060° F.

During passage through the reactor the catalyst becomes contaminated by a carbonaceous deposit or coke which deactivates the catalyst. The coke is removed and the catalyst reactivated by burning the coke off the catalyst in a stream of combustion supporting gas such as air in a kiln or regenerator of any suitable type at temperatures of about 600° to about 1400° F., preferably at about 700° to about 1100° F., at about 15 to about 600 p. s. i. a. and preferably at about 15 to about 35 p. s. i. a.

Active reforming catalyst in feed bin 11 is transferred to reactor 16 when the latter is operating at a pressure in excess of 30 or 40 p. s. i. a., say 100 p. s. i. a., through a reactor-sealing and particle transfer means of any suitable type. Thus, for example, the reactor-sealing and particle transfer means can be a pressure lock comprising gas-tight valves 12 and 14 and intermediate pressuring chamber 13 which operates in a cyclic manner as follows: With gas-tight valve 14 closed, particle form reforming catalyst flows from bin 11 into pressuring chamber 13. When chamber 13 is filled to a predetermined level, gas-tight valve 12 closes. Chamber 13 and its contents are purged with an inert and/or non-flammable gas such as flue gas drawn from a source (not shown) under pressure through pipe 33 with valve 34 open and valve 31 closed and flows through pipe 32 into chamber 13. The purge is vented through pipes 35 and 36 with valve 37 open and valve 39 closed. Valve 34 closes and chamber 13 is then pressured to at least the pressure existing in reactor 16 and preferably about 5 to about 10 p. s. i. higher. For this purpose recycle gas, i. e., gas containing hydrogen and preferably recycle gas comprising at least 25 per cent hydrogen, more desirably about 35 to about 60 per cent hydrogen, balance $C_1$ to $C_6$ hydrocarbons, under pressure flows from a source (not shown) through pipes 60, 30 and 32 with valve 31 open and valves 34, 37 and 39 closed until the pressure in chamber 13 is at least equal to that of reactor 16. Valve 31 closes and gas-tight valve 14 opens and the particle form catalyst flows into surge chamber 15. When chamber 13 is empty of catalyst, gas-tight valve 14 closes and valve 39 opens and the residual pressuring gas in chamber 13 is vented through pipes 35 and 38. When the pressure in chamber 13 is atmospheric, valve 39 closes and chamber 13 is purged with an inert and/or nonflammable gas and the purge vented through pipes 35 and 36 as described hereinbefore. This completes a cycle.

The particle form catalyst flows downwardly from surge chamber 15 into and through reactor 16 as a substantially compact column of particle form catalyst. The catalyst flows from reactor 16 through catalyst flow control means 17 of any suitable type such as a throttle valve into surge chamber 18. From surge chamber 18 the catalyst is removed, when the kiln or regenerator (not shown) is operated at a pressure below that of the reactor 16, by means of a reactor-sealing and particle transfer means of any suitable type. As illustrated, the reactor-sealing and particle transfer means is a depressuring lock comprising gas-tight valves 19 and 21 and intermediate depressuring chamber 20. The depressuring lock operates in a cyclic manner as follows: With gas-tight valves 19 and 21 closed the pressure in chamber 20 is raised to that of reactor 16 by means of recycle gas under pressure. Recycle gas under pressure flows through pipes 60, 40 and 42 with valve 41 open and valves 44, 47 and 49 closed until the pressure in chamber 20 is substantially that of reactor 16. Valve 41 closes and gas-tight valve 19 opens and particle form catalyst flows from surge chamber 18 into chamber 20 until the latter is filled to a predetermined level. Gas-tight valve 19 closes and valve 49 opens and the gas in chamber 20 is vented through pipes 45 and 48 until the pressure in chamber 20 is substantially that of the regenerator, say atmospheric. Valve 49 closes and valves 44 and 47 open and an inert and/or nonflammable purge gas such as flue gas flows through pipes 43 and 42 into chamber 20 and the purge is vented through pipes 45 and 46. Valves 44 and 47 close the gas-tight valve 21 opens and particle form catalyst flows from depressuring chamber 20 into surge chamber 22. When chamber 20 is emptied of catalyst gas-tight valve 21 closes, chamber 20 is then purged as described hereinbefore with an inert and/or nonflammable gas such as flue gas, completing a cycle.

The particle form catalyst flows from surge chamber 22 via conduit 23 and chute 24 to particle transfer means 25 of any suitable type such as gas-lift and the like, an elevator, etc. by means of which the partially deactivated catalyst is transferred to a kiln or regenerator (not shown) of any suitable type wherein the carbonaceous deposit on the catalyst can be removed by combustion in a stream of combustion supporting gas such as air.

The partially deactivated catalyst flows downwardly through the regenerator not shown in contact with the combustion-supporting gas and in its passage therethrough the carbonaceous deposit is burned off. The reactivated catalyst is transferred from the regenerator to reactor feed bin 11 by any suitable particle transfer means ready to begin another cycle.

Charge stock "M" having a "K" less than that of the transition range is drawn from a source not shown through line 65 and heated in furnace 66 to a reaction temperature. Gaseous heat carrier or gas containing at least 25 per cent hydrogen flows under pressure at least equal to that in reactor 16, flows through pipe 76, is heated in furnace 77 and leaves furnace 77 through pipe 78 under control of valve 79. The heated charge stock flows from furnace 66 through line 67 to line 68. The heated gas and the heated charge stock are mixed in line 68 in the ratio of about 1 to about 15, preferably about 4 to about 10 mols of gaseous heat carrier or about 1 to about 8, preferably about 2 to about 4 mols of hydrogen per mol of charge stock to form a charge mixture. The charge stock and the gas are heated in the respective furnaces to temperatures such that when mixed in a ratio within the range set forth hereinbefore to form a charge mixture said charge mixture will have a temperature of about 850° to about 1080° F. and preferably about 960° to about 1060° F.

The charge mixture flows through line 68 to manifold 69 and thence through one of the manifold branches 70, 71, and 72 under control of valves 73, 74 and 75 respectively into the associated distributors 87, 88 or 89 respectively. The selection of the distributor to be used is dependent upon the severity of reforming conditions to which charge stock "M" is to be subjected to produce the optimum yield of reformate having the required octane rating (O. N.). For purposes of description, charge mixture 1 containing charge stock "M" will be introduced into reactor 16 through distributor 89. For simplicity, it will be assumed that the conditions under which charge stock "P" can be reformed in optimum yield to a reformate having the same octane rating (O. N.) as the reformate from charge stock "M" when introduced into reactor 16 through distributor 89, require that charge stock "P" be introduced into reactor 16 through distributor 91. Accordingly, charge stock "P" is drawn from a source (not shown) through line 50, is heated in furnace 51 to a reaction temperature and flows through line 52 to manifold 53.

Gaseous heat carrier or gas containing at least 25 per cent hydrogen is drawn from a source (not shown) through pipes 60, 30 and 61, is heated in furnace 62 and flows therefrom to charge mixture line 52 through pipe 63 under control of valve 64.

The heated gas is mixed with the charge stock in the ratio of 1 to 15 mols, preferably about 4 to about 10 mols of gas per mol of charge stock or about 1 to about 8 mols preferably about 2 to about 5 mols of hydrogen per mol of charge stock to form a charge mixture 2. Both the charge stock and the gas are heated to temperatures such that when mixed in proportions within the ranges set forth hereinbefore the charge mixture shall have a temperature of about 850° to about 1080° F. preferably about 960° to about 1060° F.

The charge mixture in line 52 flows into manifold 53 and thence through one of the branches 54, 55 and 56 under control of valves 57, 58 and 59 and the associated distributors 91, 92 and 93 respectively into reactor 16. For the purpose of description it has been assumed that distributor 91 is used for the reasons given hereinbefore. When the moisture content of the charge mixture in line 68 is below the optimum set forth hereinafter, steam drawn from a source not shown through pipe 198 under control of valve 199 can be introduced into the charge stock in amounts sufficient to provide the concentration of liquid water set forth hereinafter.

Accordingly, charge mixture 1, comprising charge stock "M" having a "K" less than the "K" factors of the transition range and gas enters reactor 16 through distributor 89 while charge mixture 2 comprising charge stock "P" having a "K" greater than the "K" factors of the transition range and gas, enters reactor 16 through distributor 91. Charge mixture 1 flows upwardly from distributor 89 counter-current to the downwardly flowing substantially compact column of particle form reforming catalyst and in the presence of about 0.5 to about 1.0 volume per cent, preferably about 0.6 to about 0.9 volume per cent water. The gaseous contents of the reaction zone formed between distributor 89 and collector 90 are withdrawn through line 80 under control of valve 82 and thence to line 84 to line 86.

The charge mixture 2, comprising charge stock "P" and gas, flows from distributor 91 downwardly concurrent with the downwardly flowing substantially compact column of particle-form catalyst through the reforming zone formed between distributor 91 and a collector not shown associated with line 81. Since the catalyst entering the zone below distributor 91 from the upper zone above distributor 89 is practically free from moisture and/or loosely bound oxygen, the reforming reaction takes place in the lower zone in the presence of not more than about 0.04 to about 0.065 volume per cent water in the gaseous reactants and preferably in the absence of moisture in order to obtain a maximum yield of reformate having an octane rating substantially the same as the octane rating of the reformate from the upper zone.

The effluent from the lower zone passes through line 81 under control of valve 83 to line 85 and thence to line 86 where the effluents of both zones having substantially the same octane rating are processed as one product. The mixed effluent flows through line 86 to heat exchangers, condensers, separators, and fractionators and to storage and/or distribution not shown. When desirable or necessary, the effluents from the lower zone and the upper zone can be condensed separately and the condensates mixed while the non-condensed portions of the two effluents are kept separated and separately recycled to the respective reforming zones or otherwise treated to provide recycle gas of suitable moisture content.

Those skilled in the art will understand that although two furnaces for heating charge stocks and two furnaces for heating gas are shown by proper arrangement, one furnace can be used for the purpose of heating both charge stocks and the gaseous heat carrier or recycle gas.

As is well known, the "K" factor of the unreformed portion of charge stock present in the effluent of a reforming zone after one pass therethrough is generally appreciably lower than the "K" factor of the virgin charge stock. Such a situation can be met in accordance with the principles of the present invention in the manner indicated by the flow sheet of Figure 4.

Active catalyst is introduced into reactor 116 through a suitable reactor-sealing and particle transfer means (not shown). The active catalyst flows downwardly through reactor 116 as a substantially compact column of particle form catalyst and leaves reactor 116 through catalyst flow control means 117 of any suitable type and a reactor-sealing and particle transfer means (not shown) and transferred to a suitable regenerator (not shown). After regeneration, the reactivated catalyst is introduced into reactor 116 again.

A hydrocarbon reactant having a "K" of about 11.8 to about 12.5 is reformed in two passes in the absence of any substantial amount of moisture, say in the presence of less than about 0.065 volume per cent water in the reactant gases and all or a part of the effluent with or without intermediate reheating to a reaction temperature reformed in the presence of about 0.065 to about 0.6, preferably not more than about 0.4 volume per cent water in the reactant gases.

Thus, a charge stock T having the following characteristics

Specific gravity 60°/60° _______________________ 0.752
Av. molecular weight (from ASTM distillation) __ 114
Boiling range:
   Initial boiling point _________________°F.____ 129
   10% point ___________________________°F.____ 198
   50% point ___________________________°F.____ 268
   90% point ___________________________°F.____ 338
   End point ___________________________°F.____ 385
"K" _______________________________________ 11.91 is drawn from a source not shown through line 150 heated to a reaction temperature in furnace 151 and the heated charge stock discharged into charge mixture line 152.

A gaseous heat carrier or a gas containing at least 25 per cent, preferably 35 to 60 per cent hydrogen balance $C_1$ to $C_6$ hydrocarbons, such as recycle gas, flows under pressure from a source (not shown) through pipe 161, heated in furnace 162 and discharged through pipe 163 under control of valve 164 into charge mixture line 152.

The heated charge stock and gas are mixed in the ratio of about 1 to about 15, preferably about 4 to about 10 mols of gas or about 1 to about 8, preferably about 2 to about 5 mols of hydrogen per mol of charge stock. The charge stock and the gas are heated to temperatures such that when mixed in the ratios set forth hereinbefore, the temperature of the charge mixture so formed will be about 850° to about 1080° F. preferably about 960° to about 1060° F.

The charge mixture flows from line 152 to manifold 153 and thence through manifold branches 154, 155 and 156 or others not shown under control of valves 157, 158 and 159 respectively to associated distributors 191 and 192 and 193. For ease of description it will be assumed that the reforming conditions necessary to produce a reformate of given octane rating from charge stock T require that the charge mixture be introduced into reactor 116 through distributor 191 for the first pass and that the second pass be through the reforming zone formed between distributor 187 and collector 190. The charge mixture flows downwardly from distributor 191 concurrent with the substantially dry catalyst flowing from the zone formed above distributor 187 and in the presence of not more than about 0.04 to about 0.065 volume per cent water and preferably in the absence of water in the reactant gases. After one pass through the reforming zone formed below distributor 191 the effluent flows from the reactor through line 181.

In the event there is no need to reheat the reactant mixture before passing the effluent from zone A into zone B, the effluent from zone A flows from line 181 into manifold 169.

In the event that that there is need to reheat the effluent from zone A, the effluent from zone A flows to furnace 166 with valve 196 closed and valve 183 open, where it is heated to a reaction temperature. From furnace 166 the effluent from zone A flows through line 167 to line 168 and thence to manifold 169. When desirable or necessary, gaseous heat carrier and/or the aforedescribed gas containing hydrogen heated in furnace 162 flows through pipes 163 and 178 under control of valve 179 to pipes 194 and 195 through which under control of valves 187 and 190 additional gaseous heat carrier and/or hydrogen containing gas can be mixed with the effluent from zone A before the effluent passes into manifold 169.

When the unreformed portion of the charge stock in the effluent from zone A has a "K" value less than 11.6 water can be added in correlation therewith through line 198 under control of valve 199. However, in general, the "K" value usually will be greater than the transition value and optimum yields in zone B will usually be obtained without the addition of water to the effluent of zone A.

The effluent from zone A in the present description re-enters reactor 116 from manifold 169 through branch 170 and associated distributor 187 under control of valve 173. The effluent from zone A flows upwardly from distributor 187 counter-current to the downwardly flowing substantially compact column of particle-form catalyst carrying about 1.0 to about 2.0 weight per cent water and/or loosely bound oxygen which in combination with the water present in the effluent from zone A entering zone B formed between distributor 187 and collector 190 provides a concentration of water in zone B equal to about 0.4 to about 0.6 volume per cent water in the reactant gases. In the presence of the aforesaid water the effluent from zone A can be treated in zone B to yield a reformate having a given octane rating at close to the maximum yield commensurate therewith.

The effluent from zone B leaves reactor 116 via line 180 under control of valve 182 to heat exchangers, condensers, liquid-gas separators, fractionators, after-treatment, storage and/or distribution.

Figure 5:
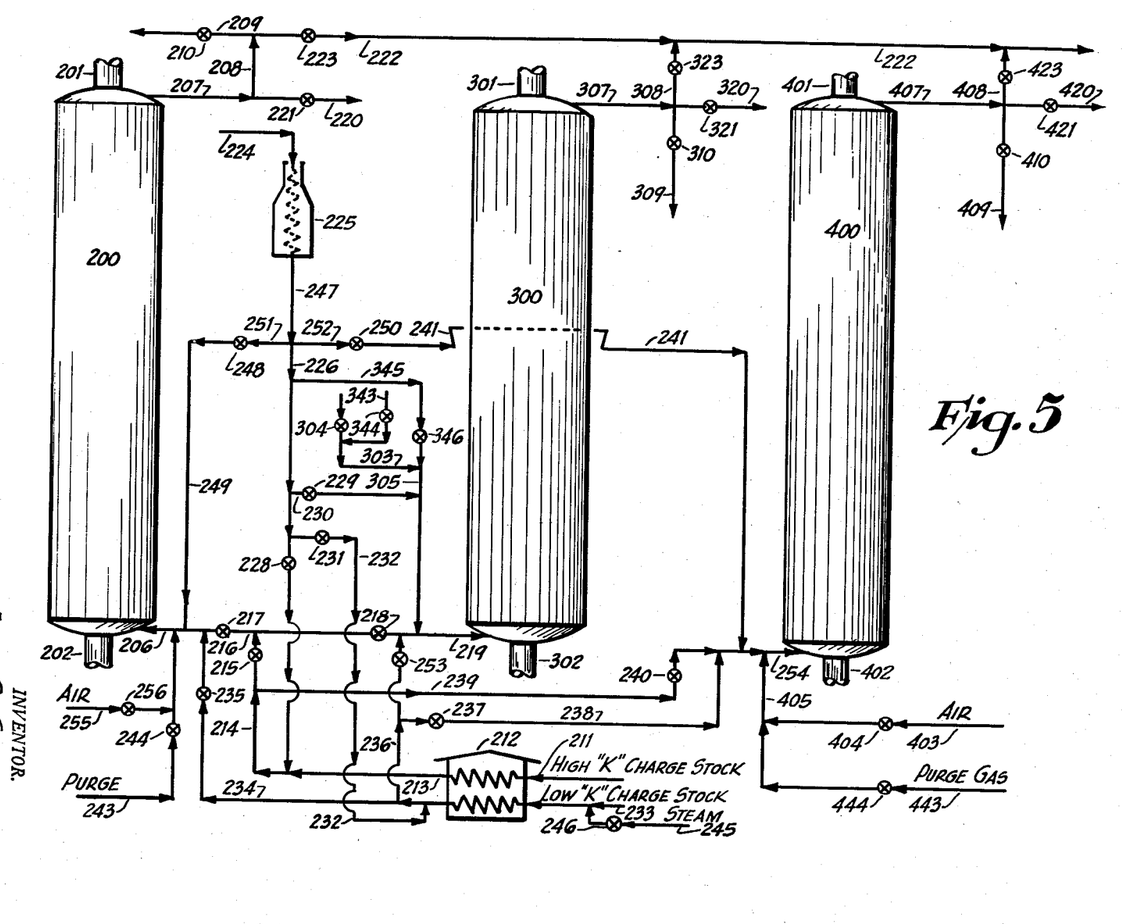
" and Figure 5 is a schematic flow sheet illustrating the application of the principles of the present invention to fixed bed reactors.

The application of the principles of the present invention to the operation of reactors having fixed beds is illustrated in Figure 5. In the drawing reactor 200 is filled with active particle-form catalyst either new or regenerated containing about 1.0 to about 2.0 weight per cent water and/or loosely bound oxygen. Reactor 300 is filled with particle-form catalyst which has been used to reform a relatively low "K" factor mixture of hydrocarbons, say a petroleum naphtha, for a sufficient time that, although active, the catalyst is substantially free from water and/or loosely bound oxygen. Reactor 400 is filled with catalyst which has been used to reform a mixture of hydrocarbons for a period of time such that the activity of the catalyst has been lowered sufficiently to require regeneration. Accordingly, reactor 200 is under purge preparatory to being placed on stream, reactor 300 is on stream on a hydrocarbon mixture having a relatively high "K" factor and the catalyst in reactor 400 is being regenerated.

Reactors 200, 300 and 400 are provided with closures 201, 301 and 401 respectively, through which the reactors are filled with catalyst and with closures 202, 302 and 402 respectively, through which the catalyst is withdrawn when the activity thereof is so reduced as to make regeneration impractical.

Since the catalyst in reactor 200 is fresh, i. e., either new or recently regenerated, it contains about 1.0 to about 2.0 weight per cent water. In other words, the catalyst contains sufficient water to deleteriously affect the yield of reformate from a charge stock having relatively high "K" factor. Accordingly, in accordance with the principles of the present invention, a charge stock having a relatively low "K" factor is first reformed over the fresh catalyst until the moisture content thereof is sufficiently low not to adversely affect the yield of reformate from a hydrocarbon stock of relatively high "K" factor.

Reactor 200 is purged with an inert and/or non-flammable gas such as flue gas drawn from a source not shown through pipe 243 under control of valve 244 with valves 217, 248 and 256 closed. The purge is vented through lines 207, 208 and 209 under control of valve 210 with valves 221 and 223 closed. Reactor 200 is then pressured with gaseous heat carrier or hydrogen containing gas to a reaction pressure up to 600 p. s. i. a., preferably about 100 to about 300 p. s. i. a. with gas drawn from a source (not shown) under pressure through pipe 224, heated in furnace 225 and thence through pipes 247, 251, 249 and 266 under control of valve 248 with valves 228, 250, 217, 235, 244, 256, 221, 223 and 210 closed. When the reactor has been brought to reaction pressure with the aforesaid gas valve 248 closes and valve 231 opens so that the heated gas flows to charge mixture line 234 through pipe 232.

A charge stock having a "K" factor relatively low compared to that of other available stocks is drawn from a source (not shown) under pressure through line 233 heated in furnace 212 and flows into charge mixture line 234. In charge mixture line 234, the heated charge stock and the heated gas are mixed in the ratio of about 1 to about 15, preferably about 4 to about 10, mols of gas or about 1 to about 8, preferably about 2 to about 5, mols of hydrogen per mol of charge stock to form a charge mixture.

The charge stock and the gas are heated to temperatures such that, when mixed in the aforesaid proportions to form a charge mixture, the charge mixture has a temperature of about 800° to about 1080° F. preferably about 960° to about 1060° F. However, it is preferred that the charge stock not be heated to a thermal reforming temperature.

The heated charge mixture flows under pressure through line 234 under control of valve 235 to line 206 and thence through a distributor (not shown) of any suitable type to be distributed across the cross-section of reactor 200. During passage of the charge mixture through lines 234 and 206, valves 217, 237 and 253 are closed. The charge mixture flows upwardly through the catalyst bed and leaves the reactor through lines 207, 208 and 222 with valves 221 and 210 closed and valve 223 open.

When the moisture content of the reactant gases in reactor 200 is less than about 0.6 to about 0.9 volume per cent water in the reactant gases, steam or water can be mixed with the charge mixture in line 233 through pipe 245 under control of valve 246 to raise the moisture content of the reactant gases to the aforesaid values.

The conversion of the charge stock having a low "K" factor relative to other available charge stocks is continued until the moisture content of the effluent gases in the absence of steam added thereto is at a minimum but the catalyst still retains practical activity. When the catalyst has reached that condition or the catalyst in reactor 400 is regenerated, the charge mixture aforedescribed comprising the charge stock having a relatively low "K" factor is diverted from reactor 200 to reactor 400 by closing valve 235 and opening valve 237. The charge mixture then flows through lines 234, 236, 238 and 254 under control of valve 237 (with valve 240 closed) into reactor 400 through a distributor (not shown). The charge mixture rises through the catalyst bed and leaves reactor 400 through lines 407 and 408 under control of valve 423 to mix with the reformate from reactors 200 and 300 which are of substantially the same octane rating (valves 410 and 421 being closed).

While the charge mixture containing the charge stock having a relatively low "K" factor is being reformed in reactor 200 and the catalyst in reactor 400 is being regenerated, a charge mixture containing a charge stock having a high "K" factor is being converted in reactor 300. The charge stock flows from a source not shown through line 211 to furnace 212 wherein it is heated as aforesaid. The heated charge stock flows into line 213. Gaseous heat carrier flows from a source not shown through pipe 224 to furnace 225 wherein it is heated as aforesaid. The heated gas flows from furnace 225 through pipes 247 and 226 with valve 228 open and valves 248 and 250 closed to charge mixture line 213 where the gas and charge stock are mixed in the proportion of about 1 to about 15 mols, preferably about 4 to about 10 mols, of gas or about 1 to about 8 mols, preferably about 2 to about 5 mols, of hydrogen per mol of charge stock. The charge mixture flows through line 214 under control of valve 215 with valves 217 and 253 closed and valve 218 open into line 219 and thence to reactor 300. Since the catalyst in reactor 300 has been used to convert a charge stock of low "K" factor relative to the charge stock of the present charge mixture, the catalyst is substantially devoid of moisture. Accordingly, the conversion of the present charge mixture takes place in the presence of less than about 0.04 to about 0.065 volume per cent water in the reactant gases.

The charge mixture flows upwardly through the catalyst bed in reactor 300 and the product being of substantially the same octane rating as that produced from the low "K" factor stock in reactor 200 flows through lines 307 and 308 under control of valve 323 with valves 310 and 321 closed into line 222 where it is mixed with the reformate from reactor 200.

Reactor 300 having been on stream to a charge mixture comprising a charge stock having a high "K" factor relative to the aforesaid charge stock and gas, and producing a reformate of substantially the same octane rating as that produced in reactor 200 and 400, the catalyst is in a condition requiring regeneration. Therefore, the charge mixture is diverted from reactor 300 by closing valve 218 in line 219 and, valve 240 being closed, the charge mixture comprising a charge stock having a "K" factor relatively high compared to the aforesaid charge stock having a low "K" factor and gas in the ratio of about 1 to about 15, preferably about 4 to about 10 mols of gaseous heat carrier or about 1 to about 8, preferably about 2 to about 5 mols of hydrogen per mol of charge stock flows into reactor 200 through lines 214, 216 and 206 with valves 215 and 217 open.

The charge mixture having the aforesaid relatively high "K" factor comprises the charge stock drawn from a source not shown through line 211 heated in furnace 212 and flows from the furnace through line 213. Gas heat carrier drawn from a source not shown through pipe 224 heated in furnace 225 flows along pipes 247 and 226 under control of valve 228 to charge mixture line 213 where it is mixed in the aforesaid proportions.

The charge stock and gaseous heat carrier are heated to temperatures such that, although the temperature of the heated charge stock is below a thermal reforming temperature, the charge mixture has a temperature of about 800° to about 1080° F., preferably about 960° to about 1060° F.

The charge mixture flows through lines 213 and 214 under control of valve 215 to lines 216 with valve 217 open and valves 235, 240 and 218 closed and thence to line 206 and the reactor 200. The charge mixture containing less than about 0.04 to about 0.065 volume per cent water in the reactant gases flows upwardly through the bed of catalyst containing essentially no moisture. Consequently, the reactant gases in reactor 200 contain less than about 0.04 to about 0.065 volume per cent water per cubic foot of reactant gases. Flow of this charge mixture is continued through reactor 200 until the activity of the catalyst therein has been reduced to value requiring regeneration.

The reformate having an octane rating substantially the same as the reformate made from the charge stock having a relatively low "K" factor during the early on-stream time of reactor 200 and being of substantially the same octane rating as the reformate concurrently produced from the charge stock having a relatively low "K" factor in reactor 400 flows from reactor 200 through lines 207 and 208 into line 222 to heat exchangers, condensers, fractionators, after-treatment, storage and/or distribution.

While reactor 400 is on stream to a charge mixture containing a charge stock having a relatively low "K" factor and reactor 200 is on stream to a charge mixture containing a charge stock having a relatively high "K" factor and the reformate from each of reactors 200 and 400 is of substantially the same octane rating, the catalyst in reactor 300 is regenerated in the following manner.

With valves 218 and 253 closed, an inert and/or nonflammable purge gas such as flue gas flows from a source (not shown) under pressure through pipes 343, 303, 305 and 219 under control of valve 344 into reactor 300 and flows upwardly therethrough. The purge escapes from reactor 300 through pipe 307 and 309 with valve 310 open and valve 321 and 323 closed. After purging, combustion supporting gas, for example, air, drawn from a source (not shown) flows through pipes 303, 305 and 219 with valve 304 open and valves 344 and 346 closed into reactor 300. The combustion supporting gas flows upwardly through the catalyst bed in reactor 300 burning off the inactivating carbonaceous contaminant laid down on the catalyst particles during the on-stream time. The products of combustion escape from reactor 300 through lines 307 and 320 with valve 321 open and valves 310 and 323 closed. After the deposit has been burned off and the catalyst is reactivated, the reactor 300 is purged again as described hereinbefore. After this purge, the reactor is pressured with gaseous heat carrier drawn under pressure from a source not shown through pipe 224 and heated in furnace 225. The heated gas flows from furnace 225 through pipes 247, 226 and 345 with valves 248 and 250 the charge mixture flows through lines 234 and 206 to closed and valve 346 open to line 219 and thence into reactor 300. Reactor 300 is now ready for use in the conversion of a charge stock having a "K" factor low relative to the charge stock being treated in reactor 200 or to be subsequently treated in reactor 300. Accordingly, the charge mixture being converted in reactor 400 is diverted to reactor 300 by closing valve 237, opening valve 253 and closing valve 218.

The charge stock having a relatively low "K" factor is drawn from a source not shown through line 233, heated in furnace 212 and leaves furnace 212 through line 234. Heated gaseous heat carrier is drawn from a source not shown through pipe 224, is heated in furnace 225, flows thence through pipes 247, 226 and 232 to line 234 with valve 228 closed and valve 231 open.

The charge stock and gas are mixed in the ratio of about 1 to about 15, preferably about 4 to about 10 mols of gas, or about 1 to about 8, preferably about 2 to about 5 mols of hydrogen per mol of charge stock to form a charge mixture having a temperature of about 800° to about 1080° F., preferably about 960° to about 1060° F. without heating the charge stock to a thermal reforming temperature.

The charge mixture flows through line 234 under control of valve 253 to line 219. With valves 235, 237 and 218 closed, the charge mixture flows into reactor 300. The charge mixture flows upwardly through reactor 300 and, since the charge stock is one having a relatively low "K" factor, in the presence of about 0.5 to about 1.0 preferably about 0.6 to about 0.9 volume per cent water in the reactant gases derived initially at least in part from the moisture and/or loosely bound oxygen of the catalyst and the balance moisture introduced in the charge mixture.

At this time the catalyst in reactor 200 requires regeneration and the catalyst in reactor 400 is ready for use in reforming charge stock of relatively high "K" factor. Accordingly, the charge mixture flowing to reactor 200 is diverted to reactor 400 by closing valve 215 and opening valve 240.

The charge stock having a high "K" factor relative to the charge stock being reformed in reactor 300 flows from a source not shown through line 211 to furnace 212 and thence to line 213. Gaseous heat carrier flows from a source not shown through pipe 224 to furnace 225 and thence via pipes 247 and 226 with valve 228 open and valves 248 and 250 closed to line 213. In line 213 the heated gas is mixed with the heated charge stock having a temperature of about 800° to about 1080° F. preferably about 960° to about 1060° F. comprising about 1 to about 15 mols, preferably about 4 to about 10 mols of gas or about 1 to about 8 mols preferably about 2 to about 5 mols of hydrogen per mol of charge stock. The charge mixture flows through lines 214 and 239 under control of valve 240 to line 254 and thence upwardly through reactor 400. The reformate leaves reactor 400 through lines 407 and 408 under control of valve 423 with valves 410 and 421 closed.

Meanwhile reactor 200 is purged with an inert and/or nonflammable gas such as flue gas drawn from a source not shown through pipe 243 under control of valve 244 and flows through line 206 upwardly through reactor 200. The purge leaves reactor 200 via lines 207 and 220 under control of valve 221.

A combustion-supporting gas such as air flows from a source not shown through pipe 255 under control of valve 256 to line 206 and thence through the reactor to lines 207, 208 and 209 with valve 210 open and valves 223 and 221 closed.

After the coke has been burned off the catalyst in the combustion-supporting gas, reactor 200 is purged and pressured as aforedescribed. Thereafter, the charge mixture containing the charge stock having the relatively low "K" factor is diverted from reactor 300 by closing valves 253, 237 and 217 and opening valve 235 whereby reactor 200.

After diverting the charge mixture containing the charge stock having a relatively low "K" factor to reactor 200 from reactor 300, the charge mixture containing the charge stock having a relatively high "K" factor is diverted from reactor 400 to reactor 300 by closing valve 240 and opening valves 215 and 218. Reactor 400 is now ready for regeneration of the catalyst therein.

Reactor 400 is purged with an inert and/or non-flammable gas such as flue gas which flows from a source not shown through pipes 443, 405 and line 254 under control of valve 444. The purge is vented through lines 407 and 420 under control of valve 421. After purging, a combustion-supporting gas flows from a source not shown through pipes 403, 405 and line 254 under control of valve 404 upwardly through reactor 400. The products of combustion are vented through lines 407 and 409 under control of valve 410. Reactor 400 is purged again as described hereinbefore and then pressured with gas flowing from a source not shown through pipe 224, furnace 225, pipes 247, 252 and 241 under control of valve 250 to line 254. After pressuring up to 600 p. s. i. a., preferably to about 100 to about 300 p. s. i. a., the catalyst in reactor 400 is ready for use in reforming a charge stock having a relatively low "K" factor to a reformate having substantially the same octane rating as the reformate produced in reactor 300 from the charge mixture containing the charge stock having a relatively low "K" factor.

As has been mentioned hereinbefore, the words "high" and "low" when used as descriptive of the "K" factor are so used either relative to the transition range of K=about 11.55 to K=about 11.70, or to express a mutual relation between stocks which are either all below or all above the transition range. Thus, a stock "U" having a "K" factor of 11.58 has a low "K" factor relative to a stock "H" having a "K" factor greater than 11.75 but high relative to a stock "L" having a "K" factor of 11.50 or less. In other words, when choosing the reforming conditions with respect to the average moisture content of the reactant gases, stock "U" would be reformed in the presence of a higher concentration of liquid water in the reactant gases than stock "H" and a lower concentration of liquid water than stock "L." Accordingly, if only stocks "U" and "L" are available, stock "L" would be reformed and then stock "U" would be reformed. If only stocks "U" and "H" were available, stock "U" would be reformed first and then stock "H." That is to say, as the "K" factor decreases toward 11.55 to 11.70, the concentration of water in the reactant gases which can be tolerated while still suffering the same loss in yield of reformate having a given octane rating, increases. At values of "K" less than about 11.6 to 11.70, it is advantageous to add sufficient water, if the average moisture content of the reactant gases is less than about 0.6 to 0.9 volume per cent water in the reactant gases, to raise the concentration of liquid water to the aforesaid value. Accordingly, it is manifest that a "K" value of about 11.55 to about 11.70 is characteristic of a charge stock which is substantially insensitive to water to the extent of about 0.065 to about 0.6 volume per cent water in the reactant gases; that a "K" value in excess of about 11.70 is characteristic of a charge stock which should be reformed in the presence of less than about 0.065 volume per cent water in the reactant gases; and that a stock having a "K" value less than about 11.55 can be reformed in the presence of about 0.6 to about 0.9 volume per cent water in the reactant gases. Therefore, the present invention provides for reforming a hydrocarbon or a mixture of hydrocarbons all or a part of the constituents of which are capable of undergoing any or all of the molecular changes known as isomerization, dehydrogenation, hydrogenation and dehydrocyclization, said molecular changes being designated herein as reforming to provide a maximum yield of reformate of given octane rating under conditions such that the total moisture content of the reactant gases expressed as volume per cent water in the reactant gases is dependent upon the "K" value of the charge stock; that the total moisture content of the reactant gases for charge stocks having a "K" value greater than about 11.70 is not greater than about 0.04 to about 0.065 volume per cent, and preferably is zero for charge stocks having a "K" value greater than 12.0; that the total moisture content of the reactant gases for charge stocks having a "K" value less than 11.55 is at least 0.6 volume per cent and may be as much as 0.9 volume per cent water in the reactant gases; and that the total moisture content of the reactant gases is about 0.065 to about 0.6 volume per cent water in the reactant gases for the transition range, i. e., "K" values of about 11.55 to about 11.70.

I claim:

1. In a method of reforming hydrocarbons which comprises contacting a reforming catalyst with reactant gases comprising a hydrocarbon capable of being reformed and a gaseous heat carrier under reforming conditions of temperature and pressure and in the presence of a predetermined amount of moisture, the step of measuring the "K" value of the hydrocarbon charge stock and regulating the moisture content of said reactant gases relative to the "K" value of the hydrocarbon charge stock thus determined such that the moisture content is about 0.5 volume per cent in said reactant gases for hydrocarbons having a "K" value of about 11.55 to about 11.70, and about 0.6 to about 0.9 volume per cent in said reactant gases for hydrocarbons having a "K" value less than about 11.55, and less than about 0.065 volume per cent in said reactant gases for hydrocarbons having a "K" value in excess of about 11.70.

2. In a method of reforming hydrocarbons which comprises flowing a particle-form solid reforming catalyst downwardly through at least two reaction zones in contact with hydrocarbons to be reformed under reforming conditions of temperature and pressure including the presence of a predetermined amount of moisture depending upon the "K" value of the hydrocarbon reactant to produce a reformate of substantially the same required octane rating in each reaction zone, the steps of measuring the "K" value of a first hydrocarbon charge stock and introducing into the first reaction zone reactant gases comprising a gaseous heat carrier and a first charge stock having a "K" value less than about 11.75 as thus determined regulating the moisture content of the reactant gases in said first reaction zone to at least about 0.6 volume per cent water, measuring the "K" value of a second hydrocarbon charge stock and introducing reactant gases comprising a gaseous heat carrier and a second charge stock having a "K" value greater than 11.75 as thus determined and greater than the "K" value of said first charge stock into a second reaction zone, and regulating the moisture content of the reactant gases in said second reaction zone to less than about 0.065 volume per cent water and less than the moisture content of the reactant gases of said first reaction zone.

3. In a method of reforming hydrocarbons which comprises flowing a particle-form solid reforming catalyst downwardly through at least two reaction zones in contact with hydrocarbons to be reformed under reforming conditions of temperature and pressure including the presence of a predetermined amount of moisture depending upon the "K" value of the hydrocarbon reactant in each reaction zone to produce a reformate of substantially the same octane rating in each reaction zone, the steps of measuring the "K" value of a first hydrocarbon charge stock and introducing into the first reaction zone a first charge mixture comprising a gaseous heat carrier and a first charge stock, regulating the moisture content of the vapors in said first reaction zone to a maximum dependent upon the "K" value of said first charge stock, measuring the "K" value of a second hydrocarbon charge stock and introducing into the second reaction zone a second charge mixture comprising a gaseous heat carrier and a second charge stock having a "K" value greater than that of said first charge stock, and regulating the moisture content of the vapors in said second reaction zone to a maximum dependent upon the "K" value of said second charge stock and less than the moisture content of the vapors in said first reaction zone, the moisture content of the vapors in said first reaction zone being about 0.6 to about 0.9 volume per cent for charge stocks having a "K" value of less than 11.55 as thus determined and being finite but less than 0.6 to 0.9 volume per cent for charge stocks having a "K" value of 11.55 to 11.75 as thus determined.

4. In a method of reforming hydrocarbons which comprises flowing a particle-form solid reforming catalyst downwardly through at least two reaction zones in contact with hydrocarbons to be reformed under reforming conditions of temperature and pressure including the presence of a predetermined amount of moisture depending upon the "K" value of the hydrocarbon reactant to produce a reformate of substantially the same octane rating in each reaction zone, the steps of measuring the "K" value of a first hydrocarbon charge stock and introducing into a first reaction zone a first charge mixture comprising a gaseous heat carrier and a first charge stock having a "K" value less than about 11.6 as thus determined, regulating the moisture content of the vapors in said first reaction zone to not more than about 0.9 volume per cent, measuring the "K" value of a second hydrocarbon charge stock and introducing a second charge mixture comprising a gaseous heat carrier and a second charge stock having a "K" value greater than 11.6 as thus determined and greater than that of said first charge stock into a second reaction zone, and regulating the moisture content of the vapors in said second reaction zone to less than 0.65 volume per cent.

5. The method as set forth in claim 1 wherein the reforming catalyst comprises at least 70 mol per cent alumina and about 18 to about 30 mol per cent chromium oxide.

6. The method as set forth in claim 1 wherein the reforming catalyst comprises at least 70 mol per cent alumina and about 18 to about 30 mol per cent chromium oxide, contains about 1.0 to about 2.0 weight per cent water and wherein the catalyst is contacted successively with a first charge mixture comprising a gaseous heat carrier and a first charge stock and with a second charge mixture comprising a gaseous heat carrier and a second charge stock, said first charge stock having a measured "K" value lower than the measured "K" value of said second charge stock and the moisture content of the vapors in the second reaction zone being lower than the moisture content of the first reaction zone and the moisture content of both reaction zones being dependent upon the measured "K" value of the charge stock present in each reaction zone.

References Cited in the file of this patent
UNITED STATES PATENTS

| | | |
|---|---|---|
| 2,131,089 | Beeck et al. | Sept. 27, 1938 |
| 2,322,863 | Marschner et al. | June 29, 1943 |
| 2,398,674 | Schulze | Apr. 16, 1946 |
| 2,433,603 | Danner et al. | Dec. 30, 1947 |
| 2,642,383 | Berger et al. | June 16, 1953 |